United States Patent [19]

Goering et al.

[11] 4,042,414

[45] Aug. 16, 1977

[54] PROCESSING OF STARCH

[75] Inventors: Kenneth Justin Goering; Robert Freeman Eslick, both of Bozeman, Mont.

[73] Assignee: Research Corporation, New York, N.Y.

[21] Appl. No.: 506,759

[22] Filed: Sept. 17, 1974

[51] Int. Cl.$^2$ ............................................. C13L 1/08
[52] U.S. Cl. ..................................... 127/32; 127/67; 127/68; 209/162
[58] Field of Search ...................... 127/29, 32, 67, 68; 209/162

[56] References Cited

U.S. PATENT DOCUMENTS

| | | | |
|---|---|---|---|
| 2,228,717 | 1/1941 | Berquist | 127/68 |
| 2,368,668 | 2/1945 | Langford et al. | 127/68 |
| 3,901,725 | 8/1975 | Bond et al. | 127/69 X |

OTHER PUBLICATIONS

Whistler, R. L., *Methods in Carbohydrate Chemistry*, N. Y., Academic Press, 1964, vol. IV, chapter 6, pp. 20–24, by Yamazak; W. T., and Wilson; J. T., *Separation of Starches into Fractions of Uniform Granule Size*.
Whistler, R. L., *Methods in Carbohydrate Chemistry*, N. Y., Academic Press, 1964, vol. IV, ch. 1, pp. 3–4, by Watson, S. A., *Corn Starch*.

*Primary Examiner*—Morris O. Wolk
*Assistant Examiner*—Roger F. Phillips
*Attorney, Agent, or Firm*—Oblon, Fisher, Spivak, McClelland & Maier

[57] ABSTRACT

Waxy, small granule starch of high spreadability, and waxy, large granule starch which is capable of forming an exceptionally clear and bright paste, are simultaneously produced by steeping waxy barley grain for a period of at least 12 hours in an aqueous solution containing sulfur dioxide at a temperature of 45°–55° C so as to swell the grain and extract soluble protein contained within said grain, water washing and milling said steeped grain, separating the starch from fibers and protein, suspending said starch in water to form a suspension containing less than 15% wt solids, permitting larger granules to settle for a period of at least 2 hours and recovering a larger granule fraction, said larger granules being characterized by an average particle size of greater than 10$\mu$, and breaking the remaining suspension and recovering therefrom a smaller granule fraction, said small granules being characterized by an average particle size of from 2.5 to 10$\mu$.

8 Claims, No Drawings

PROCESSING OF STARCH

BACKGROUND OF THE INVENTION

1. Field of the Invention

This invention relates to the formation of small and large granule, waxy starch fractions from waxy barley grains, and more particularly to a small granule waxy starch fraction which is characterized by a high degree of spreadability and to a large granule waxy starch fraction, which is capable of forming an exceptionally bright and clear paste.

2. Description of the Prior Art

Rice starch granules are currently widely being used in the formation of face powders or body drying powders, such as "talcum" powder. However, talc had proven to be largely unacceptable for many types of body powders, particularly baby powders, since talc can cause severe lung irritations.

Rice starch has proven to be a very successful substitute for talc since it is relatively non-allergenic and its 4–8 micron average particle size is too large to block the skin pores. Moreover, it has a high degree of spread ability, which means that it will not cake easily, and the particles do not have a high degree of mutual attraction. One difficulty with rice starch, however, is that it is rather expensive. Substitutes for rice starch have therefore been suggested, however, none of the substitutes heretofore suggested have proven to be completely satisfactory. Corn starch and cow cockel starch have been suggested as potential substitutes for rice starch, however, it was found that the proportion of small grain particles in those varieties of starch was unacceptable. Cow cockel starch, for instance, has a particle size range of 0.75 to 2.0 microns; with a significant portion of its granules in the range of 0.75 to 1 $\mu$. Moreover, cow cockel starch will not form a clear paste, as do the waxy starches.

A need continues to exist therefore for an inexpensive substitute for rice starch granules, which substitute would have a particle size large enough not to block or clog pores in human skin, yet which has the same favorable spreading ability.

There is concurrently a need for a waxy starch material which will form a clear, bright paste which can be used in food applications. The paste should be as free of a hazy coloration as possible. Waxy corn and waxy milo starches have been found to be satisfactory for this purpose, however, both are presently sold at a price substantially above regular starch.

The present inventors had considered using barley starch, and in particular, a new variety of barley starch developed by the present inventors known as Waxy Compana starch, which can be produced quite economically. However, that variety likewise was found to produce a hazy paste. As will be discussed further below, it has now been found that the haze is effectively eliminated by separating out the smaller granules from the larger granules and forming the paste only from the larger granules.

A need therefore exists for a form of starch that can be prepared into a very clear, essentially haze-free starch paste.

SUMMARY OF THE INVENTION

Accordingly, it is one object of this invention to provide a substitute for rice starch for such applications as body powders and the like, which is less expensive than rice starch.

Another object of this invention is to provide a form of starch which can be made into a bright, essentially haze-free paste.

These objects and other objects of this invention as will hereafter become more readily apparent by the following description, have been attained by simultaneously producing a waxy, small granule starch, and a waxy, large granule starch by the process of steeping waxy barley grain for a period of at least 12 hours in an aqueous solution containing sulfur dioxide at a temperature of 45°–55° C so as to swell the grain and extract soluble protein contained within said grain, water washing and milling said steeped grain, separating the starch from fibers and protein, suspending said starch in water to form a suspension containing less than 15% wt solids, permitting larger granules to settle for a period of at least 2 hours and recovering a larger granule fraction, said larger granules being characterized by an average particle size of greater than 10 $\mu$, and breaking the remaining suspension and recovering therefrom a smaller granule fraction, said small granules being characterized by an average particle size of from 2.5 to 10 $\mu$.

DETAILED DESCRIPTION OF THE PREFERRED EMBODIMENTS

The barley grain used in this invention may be any waxy variety, such as Waxy Compana, a new variety developed by the present inventors, or Waxy Oderbrucker. Waxy Compana is the preferred variety.

The barley grain is first steeped in an aqueous solution containing sulfur dioxide, or in a solution containing a material which is a source of sulfur dioxide, such as metabisulfite. The quantity of sulfur dioxide may be sufficient to provide a solution of 0.1 to 0.4% wt and preferably 0.1 to 0.2% wt. The steeping temperature should be adjusted to between 45° to 55° C. Above 55° C, the possibility of gelation is enhanced and the solution becomes unmanageably viscous. Below 45° C, the steeping time becomes unacceptably lengthy.

The pH of the steeping solution should be slightly acidic, i.e., approximately pH 4.5–7, and preferably pH 5–6 which can be adjusted by the addition of lactic acid. In continuous operations, the lactic acid is furnished by natural fermentation by maintaining the initial grain in an acid condition. The lactic acid also functions to stop fermentation which might otherwise occur.

The effect of the steeping treatment is to swell the grains and to extract the soluble proteins. The swollen grains are then water washed, several times if necessary, and milled. A burr mill or a bar mill is suitable for this purpose. Milling tears the grains apart and releases its component granules. The milled grain, in a slurry form, is then passed through a screen to separate out fibers or larger unmilled or insufficiently milled particles. There is no criticality in the screen size, however, screens of at least 150 mesh have been found to be acceptable. The overs from the screening process are mixed with water and are remilled. The slurry granules passing through the screen are then subjected to a smaller screen, such as a screen at least 400 mesh. That portion of the slurry which passes through the second screen appears as a "cream". The starch granules can be recovered from the cream by centrifugal action, after which the granules can be resuspended into a suspension containing at least 15% wt solids. A smaller solids content will form a sharper separation between the large and small granules, but would take unacceptably long from an industrial point of view. The suspension is permitted to stand for a period of at least 12 hours, and preferably no longer than 12 hours. Longer periods of time will increase the sharpness of the separation, but is generally impractical. The large granules will settle out of the suspension and the remaining supernatant suspension can be siphoned off or decanted.

The remaining suspended granules are sufficiently small that they remain stably suspended due to simple Brownian movement. The suspension can nevertheless be broken by the use of a centrifuge.

The large granule fraction obtained during settling from the suspension will have an average particle size from $10\mu$ to $40\mu$. The small granule fraction obtained by breaking the final suspension will have an average particle size of $2.5\mu$ to $10\mu$. Of course, some minor amount of large granules may appear in the small particle fraction, and vice versa, since the effort to provide an absolutely clean separation would not be industrially justified. Moreover, there may be a limited number of granules of a size of between 1.75 and $2.5\mu$ in the small granule fraction.

Each of the granule fractions may then be dried in an air stream being careful to remove the starch from the drying medium before it reaches gelatinization.

The small granule fraction is characterized by excellent spreadability and can be effectively used as a substitute for not only rice starch, but also corn starch. Spreadability is measured by taking weighed amounts of the starch granule fractions which are rubbed onto black paper using ordinary finger pressure and comparing the size of the area covered. Interestingly, it has been found that the small granule starch fraction of this invention is characterized by not only superior spreadability, but it has a greater tenacity to the paper as compared with corn starch. Tenacity is measured by rubbing the spot on the black paper with cheese cloth and determining the quantity removed.

It has also now been found that waxy barley it distinct from other cereal grains in that it contains a wide starch granule distribution, with the small particle size granules accounting for 6-30% of the total weight. This means that one could obtain an increased yield of from 50-100% of small particle size granules, as compared with other cereals, such as corn starch.

The waxy barleys, and in particular, Waxy Compana barley have now been found to have the same pasting characteristics as waxy corn or waxy milo. Unlike those starch sources, however, the starch obtained from the large particle size waxy barley is capable of producing a short paste. The waxy barley therefore is superior to waxy corn or waxy milo which yield stringy pastes, which are undesirable for food applications.

Corn starch and milo starch are widely used in the paper making industry as a coating material for the paper. Here again, waxy barley, and in particular, Waxy Compana is superior to corn starch or milo starch because it is characterized by superior adhesive properties for cellulosic subtrates.

Moreover, the pastes produced by the large particle size granules are very bright and exhibit an almost haze-free appearance. When pastes were first prepared from Waxy Compana, it was found to be characterized by substantial haze. Surprisingly, however, when the small particle size granules were separated from the large particle size granules, and the paste produced only from the large particle size granules, the paste appeared to be substantially free of haze.

Still another advantage of the waxy barleys is that it has now been found that pasting will occur at a lower temperature (20° C) than other barley starches. This is completely unexpected since heretofore it has been known that the waxy varieties will paste at about the same temperature as the ordinary variety. That is, waxy corn and waxy milo paste at the same temperature as ordinary corn and ordinary milo. Unexpectedly, however, waxy barley has been found to paste at a temperature which is significantly lower than ordinary barley. The waxy barley is therefore a superior starch source for the production of glucose syrups or for fermentation. Glucose syrups, of course, are now being heavily used in the beer brewing industry.

Waxy Compana barley, which is the preferred source of starch used in the present invention, is a new species of barley which has been developed by the present inventors. It was developed by introducing the waxy gene from Waxy Oderbrucker barley and back-crossing seven times with Compana barley.

The pasting temperature of Waxy Compana is nearly 20° C lower than normal barley starches. In general, pasting will occur before a temperature of 80° C is reached indicating that this barley starch is easily broken down by bacterial $\alpha$-amylase. This high enzyme susceptibility is believed to be a result of the fact, as observed by microscopic examination, that the granules contain fissures, which permit easy enzyme attack. Ordinary strains of barley starch granules are rather enzyme resistant.

Having generally described the invention, a more complete understanding can be obtained by reference to certain specific examples, which are included for purposes of illustration only and are not intended to be limiting unless otherwise specified.

EXAMPLE 1 bushel of grain from waxy Compana barley was steeped 48 hours in 0.2 weight percent metabisulfite at 50° C with the initial pH adjusted to 5 using lactic acid. The grain was then thoroughly washed, milled through a burr mill, screened on 150 mesh screen, the overs mixed with additional water and agitated for 2 min. in a 1 gallon Waring Blendor and then rescreened. The latter process was repeated two additional times.

The starch slurry passing through the 150 mesh was screened through a 400 mesh screen and then recovered by centrifuging in a 6 inch Bird continuous centrifuge at 6000 RPM. Examination of the effluent from the Bird indicated few, if any, small granules were lost, although considerable protein was removed. The starch cream was resuspended in warm water (30 gallons) and allowed to stand several hours until microscopic observations indicated nearly all of the large granules had settled. The small granule starch suspension was removed by the use of a siphon and it was recovered in a 4 inch solid basket centrifuge. The small granule starch recovered in this manner was then resuspended and the process repeated many times until free of large granules. If total yield is not a factor, by allowing proper time of standing, a rather pure fraction can be obtained. Some of the large granule starch which settled rapidly in the 30 gallon containers was removed from the bottom (the first to settle was largest and after longer standing medium and small granule starch is found mixed with it), resuspended and the small granule starch siphoned away from the large granules. By using large 5 gallons glass containers the large granule starch can easily be observed as it forms a layer in the bottom while the small granules form a milky looking suspension above it. The final starch fractions were recovered by centrifugation and dried at room temperature in a stream of warm air.

A weighed amount of the dry starch, corrected to dry basis, was suspended in a known volume of 20% sucrose for the counting of individual granules. Although the large granules were found to be easily dispersed, it was necessary to agitate the small granules for 5 minutes in a Virtis mixer to break up all clumping. Using this technique no difficulty was observed in getting uniform mixtures of individual granules.

Counting of large and small granules was done in a Neubauer counting chamber and counts were originally determined in mm³. Standard methods of counting were used and 5 counts were made.

The minimum size of the granules was 2.5µ and the maximum was 25.0µ with the average being in the range of 4–20µ. The ratio of small granules to large granules was 9.6/1 which amounted to about 10.2% by weight small granules.

Having now fully described the invention, it will be apparent to one of ordinary skill in the art that many changes and modifications can be made thereto without departing from the spirit or scope of the invention as set forth herein.

What is claimed as new and intended to be covered by letters patent is:

1. A method for the simultaneous production of a waxy, small granule starch of high spreadability, and a large granule, waxy starch which is capable of forming an exceptionally clear and bright paste, which comprises:
   a. steeping waxy barley grain for a period of at least 12 hours in an aqueous solution containing sulfur dioxide at a temperature of 45°–55° C so as to swell the grain and extract soluble protein contained within said grain,
   b. water washing and milling said steeped grain,
   c. separating fiber and protein from the starch granules in said grain,
   d. suspending said starch granules in water to form a suspension containing less than 15% wt solids,
   e. permitting larger granules to settle for a period of at least 2 hours and recovering a larger granule fraction, said larger granules being characterized by an average particle size of greater than 10µ, and
   f. breaking the remaining suspension and recovering therefrom a smaller granule fraction, said small granules being characterized by an average particle size of from 2.5 to 10µ.

2. The process of claim 1, wherein said waxy barley being treated is Waxy Compana barley.

3. The process of claim 1, wherein said waxy barley grains are steeped in a slightly acidic solution of sodium meta-bisulfite which forms sulfur dioxide in said solution.

4. The process of claim 1, wherein said milled grains are screened to a mesh size of at least 150 prior to being suspended.

5. The process of claim 1, wherein said suspension is broken by subjecting said suspension to centrifugal action.

6. A method for the simultaneous production of a waxy, small granule waxy starch of high spreadability, and a large granule, waxy starch which is capable of forming an exceptionally clear and bright paste which comprises:
   a. steeping Waxy Compana grain for a period of 12 to 50 hours in an aqueous solution containing sodium meta-bisulfite at a temperature of 45°–55° C so as to swell the grain and extract soluble protein contained within said grain,
   b. water washing and milling said steeped grain and screening said grain to a mesh size of 150,
   c. separating fiber and protein from the starch granules in said grain,
   d. supending said separated starch granules in water to form a suspension containing less than 15% wt solids,
   e. permitting larger granules to settle for a period of 2–20 hours and recovering a larger granule fraction being characterized by a particle size of greater than 10µ, and
   f. subjecting said suspension to centrifugal so as to break said suspension and recovering a smaller granule fraction, wherein small granules are characterized by an average particle size of from 2.5µ to 10µ.

7. A small granule starch which is characterized by high spreadility and which can be used as a substitute for rice starch, which comprises small, waxy starch granules separated from Waxy Compana barley having an average particle size of 2.5µ to 10µ.

8. A large granule waxy starch which is capable of forming an exceptionally clear and bright paste, which comprises large waxy starch granules separated from Waxy Compana barley having an average particle size of 10µ to 40µ.

* * * * *